(12) United States Patent
Liu

(10) Patent No.: US 10,041,567 B2
(45) Date of Patent: Aug. 7, 2018

(54) DRIVING CONTROL SYSTEM OF INTERNAL CLUTCH

(71) Applicant: Jen-Chih Liu, Kaohsiung (TW)

(72) Inventor: Jen-Chih Liu, Kaohsiung (TW)

(*) Notice: Subject to any disclaimer, the term of this patent is extended or adjusted under 35 U.S.C. 154(b) by 565 days.

(21) Appl. No.: 14/663,468

(22) Filed: Mar. 20, 2015

(65) Prior Publication Data

US 2016/0273618 A1    Sep. 22, 2016

(51) Int. Cl.
*F16H 1/46* (2006.01)
*B62M 11/16* (2006.01)

(52) U.S. Cl.
CPC ............. *F16H 1/46* (2013.01); *B62M 11/16* (2013.01)

(58) Field of Classification Search
CPC ........... F16H 1/46; F16H 15/48; B62M 11/16; F16D 41/30; F16D 41/12
See application file for complete search history.

(56) References Cited

U.S. PATENT DOCUMENTS

| 5,078,664 | A | * | 1/1992 | Nagano | B62L 5/16 475/296 |
| 6,692,400 | B2 | * | 2/2004 | Butz | B62M 11/16 475/296 |
| 7,874,955 | B2 | * | 1/2011 | Patterson | B62J 13/04 475/259 |
| 2007/0225107 | A1 | * | 9/2007 | Liu | F16H 63/04 475/269 |
| 2015/0273940 | A1 | * | 10/2015 | Forrest | F16H 1/46 475/300 |
| 2016/0305496 | A1 | * | 10/2016 | Liu | F16D 21/04 |

* cited by examiner

*Primary Examiner* — David J Hlavka

(57) ABSTRACT

A driving control system of an internal clutch comprises a cam; a first control unit for switching a power input to be from a planet gear frame or from an inner gear; the first control unit being by the cam through a first driving rod; a second control unit for controlling a sun gear to be at a power output state or at a releasing state; the second control unit being driven by the cam through a second driving rod; and a third control unit for controlling a power output to be from a planet gear frame or from an output power of an inner gear; the third control unit being driven by the cam through a third driving rod. The first, second and third driving rods are driven by the same cam so as to precisely control movements and moving sequence of the first, second and third control units.

4 Claims, 3 Drawing Sheets

| Control Table | C1 | C2 | C3 |
|---|---|---|---|
| 1 | A | S1 | R |
| 2 | A | S2 | R |
| 3 | A | S2 | A |
| 4 | R | S2 | A |
| 5 | R | S1 | A |

| Control Table | C1 | C2 | C3 |
|---|---|---|---|
| 1 | O | O | X |
| 2 | O | X | X |
| 3 | O | X | O |
| 4 | X | X | O |
| 5 | X | O | O |

DRIVING CONTROL SYSTEM OF INTERNAL CLUTCH

FIELD OF THE INVENTION

The present invention related to a driving control system of an internal clutch, wherein driving rods of different control units of the internal clutch of a bike are driven by the same cam; the cam controls movements of the driving rods to precisely control movements and operation sequences of the first, second and third control units. Various control sequences for controlling the movements of the driving rods are not overlapped; and the cam is one of an axial plane cam, a radial cam, an inner cam, an outer cam or a cam-like component.

BACKGROUND OF THE INVENTION

The control mechanism of an internal clutch of a bicycle is complicated and also is heavy, expensive and has a large volume. Meanwhile, it is insensitive in operation so as to deteriorate the quality of a bicycle. Therefore, it is eager to develop and improve the prior art internal clutch of a bicycle.

Other than the designs of gears and paths of the internal clutch, to improve the driving rods and other structural elements of the internal clutches is related to the structures, weights and costs, sensitivity and preciseness in controlling. Therefore, there is an eager demands to have an internal clutch of a bike which has a simple structure, a light weight and a low cost, high sensitivity and high preciseness in controlling.

SUMMARY OF THE INVENTION

The structure of the present invention has a simple structure, less elements, a small volume, which can save storage spaces effectively and reduce the weight thereof. Furthermore cost is reduced so as to promote the usage in use. The structure of the internal clutch of a bicycle is simplified effectively for improving the efficiency in assembly and repairing so as to increase the usages in industry and thus is economic. Furthermore in the present invention, the driving rods of the clutch units of the internal clutch are controlled by only one cam. By rotation of the cam, all the driving rods are displaced easily and precisely controlled so as to drive the control units of the internal clutches to achieve the object of speed changes of the control units.

To achieve above object, the present invention provides a driving control system of an internal clutch comprises a cam; a first control unit for switching a power input to be from a planet gear frame or from an inner gear; the first control unit being by the cam through a first driving rod; a second control unit for controlling a sun gear to be at a power output state or at a releasing state; the second control unit being driven by the cam through a second driving rod; and a third control unit for controlling a power output to be from a planet gear frame or from an output power of an inner gear; the third control unit being driven by the cam through a third driving rod; wherein the first driving rod, the second driving rod and the third driving rod are driven by the same cam; the cam controls movements of the first, second and third driving rods to precisely control movements and moving sequence of the first, second and third control units.

Furthermore, moving tracks of the first, second and third driving rods are one of a leftward and rightward moving track, an upward and downward moving track and a rotational moving track. The cam is one of an axial plane cam, a radial cam, an inner cam, an outer cam or a cam like assembly.

DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
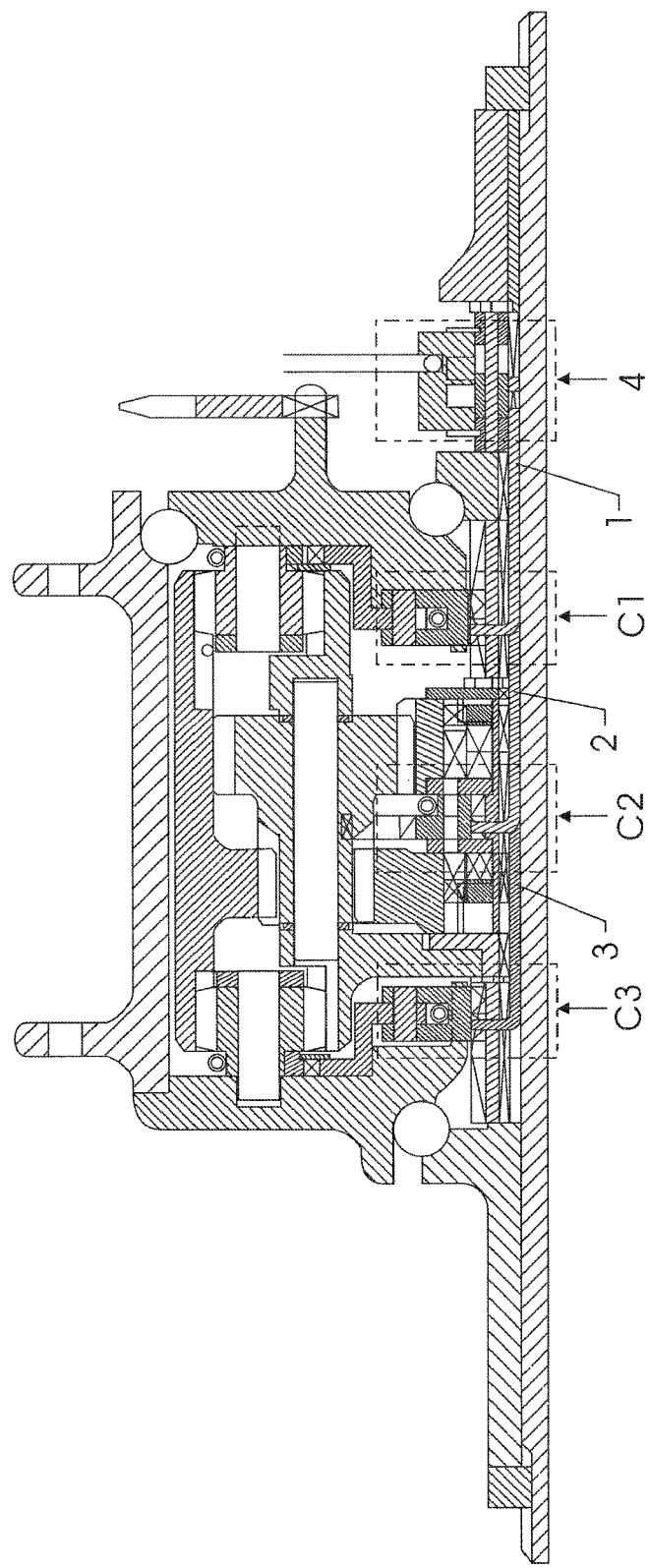
FIG. 1 is a cross sectional view of the present invention.

Referring to FIG. 1, a driving structure for an internal clutch according to the present invention is illustrated. The internal clutch has at least one planet gear system and a control structure for controlling the planet gear system. The control unit of the present invention includes the following elements.

A cam 4 is included

A first control unit C1 for switching a power input state to be from a planet gear frame A or from an inner gear R; the first control unit C1 is connected to the cam 4 through a first driving rod 1;

A second control unit C2 for controlling a sun gear to be at a power output state or at a releasing state; the second control unit C2 is connected to the cam 4 through a second driving rod 2; and A third control unit C3 for controlling a power output state to be from a planet gear frame A or from an output power of an inner gear R; the third control unit C3 is connected to the cam 4 through a third driving rod 3.

The feature of the present invention is that the first driving rod 1, the second driving rod 2 and the third driving rod 3 are driven by the same cam 4. By designing the cam to control movements of the first, second and third driving rods to precisely control movements and operation sequence of the first, second and third control units C1, C2 and C3 so that only one cam 4 can precisely control the first, second and third driving rods C1, C2 and C3. In the present invention, the cam 4 may be one of an axial plane cam, a radial cam, an inner cam, an outer cam or other similar cams. In this description, a plane cam is used as an example, however, other kinds of cams are usable in the present invention, which is not used to confine the scope of the present invention.

Figures 2, 3, 4:
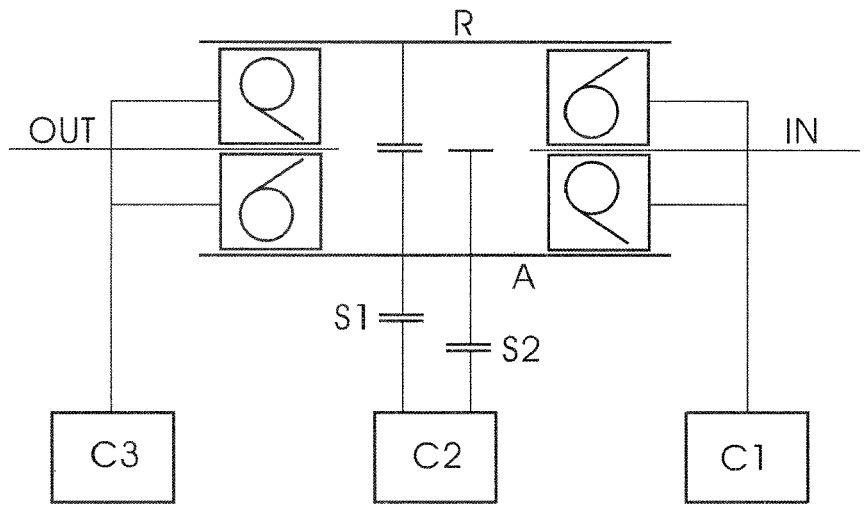
FIG. 2 is a schematic view showing a five stage speed change using a star gear set according to the present invention.
FIG. 3 shows a sequence table of the structure shown in FIG. 2.
FIG. 4 is a simplifying table of FIG. 3.

Referring to FIG. 2, a star-gear form five stage clutch is used as an example. In this embodiment, a five stage clutch is used as an example. The clutch comprises the following elements.

A first control unit C1 serves for switching a power input state to be from a planet gear frame A or from an inner gear R.

A second control unit C2 serves for controlling a sun gear to be at a power output state (S1) or at a releasing state (S2).

A third control unit C3 for controlling a power output state to be from a planet gear frame A or from an output power of an inner gear R.

The speed change stages of the first control unit C1, the second control unit C2 and the third control unit C3 are arranged as those shown in the FIG. 3. Then the A in the first control unit C1 is defined as 0, R is defined as X; the S1 in the second control unit C2 is defined as 0, S2 is defined as X; the A in the third control unit C3 is defined as 0, R is defined as X; and then the FIG. 4 is get.

The various states of the first, second and third control units are listed in FIG. 3. Then the states A and S1 in FIG. 3 is defined as 0 and the states R and S2 are defined as X as a result a table as those shown in FIG. 4 is got.

Figure 5:
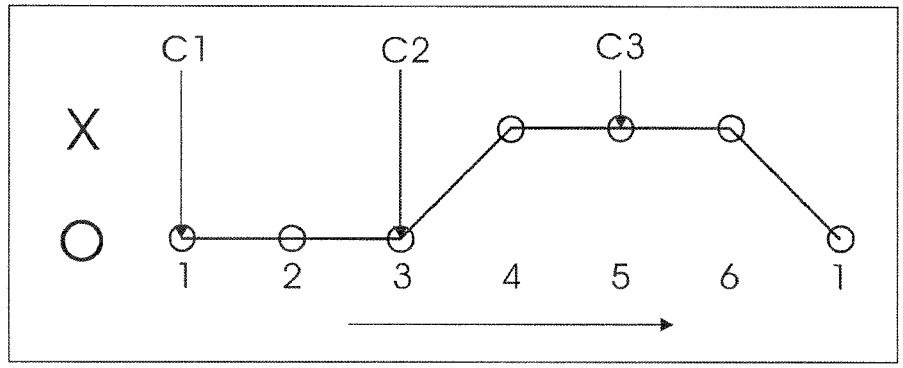
FIG. 5 is a schematic view showing tracks in one embodiment of the present invention.
Figure 6:
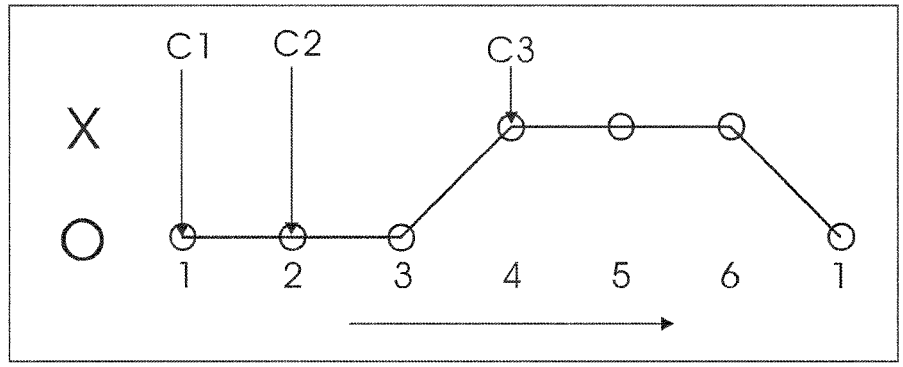
FIG. 6 is a schematic view showing the track in another embodiment of the present invention.

Referring to FIG. 4, in that the first control unit C1, the second control unit C2 and the third control unit C3 are designed as to be controlled by one element (the cam 4), as illustrated in FIG. 5. In the present invention, only that the control units C1, C2 and C3 are controlled to match the sequence of OOOXXX and the sequence has no overlapped, Then the sequence is usable. Furthermore in the present invention, the control units C1, C2 and C3 may be simplified and some stages are not used so that five stage speed change can be simplified as two stages or three stages speed change, that is no S2 and on the control unit C2, than a three stage speed change is formed. Based on this principle, the structure can be expanded as two sets of five stage speed change system so as to change to elements so as to 25 (5×5) speed change.

With reference to FIG. 1, in this embodiment, the control units C1, C2 and C3 are controlled transversally and the cam 4 (such as an axial plane cam) is used to control the driving rods 1, 2 and 3 of the control units C1, C2 and C3. Each driving rods 1, 2 and 3 are moved transversally along a left and right side path. Based on above mentioned principle, it is defined that the leftward movement of each driving rod 1, 2, or 3 is defined as X (referring to FIG. 4), and then using the track in FIG. 5 to form a track of the cam 4, by the rotation of the cam 4 (i. e., rotation of the track), the driving rods 1, 2 and 3 move leftwards and rightwards precisely so as to control the clutching operation of the control units C1, C2 and C3 to have the effect of speed change. The operation and rotation of the cam 4 may be realized by a linear wheel or by electric driving and other ways.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A driving control system of an internal clutch comprising:
   a cam;
   a first control unit for switching a power input to be from a planet gear frame or from an inner gear; the first control unit being by the cam through a first driving rod;
   a second control unit for controlling a sun gear to be at a power output state or at a releasing state; the second control unit being driven by the cam through a second driving rod; and
   a third control unit for controlling the power output to be from the planet gear frame or from an output power of an inner gear; the third control unit being driven by the cam through a third driving rod;
   wherein the first driving rod, the second driving rod and the third driving rod are driven by the same cam; the cam controls movements of the first, second and third driving rods to precisely control movements and moving sequence of the first, second and third control units.

2. The driving control system of the internal clutch as claimed in claim 1, wherein a moving track of each of the first, second and third driving rods is one of a leftward and rightward moving track, an upward and downward moving track and a rotational moving track.

3. The driving control system of the internal clutch as claimed in claim 1, wherein there are at least one planet gear system and there are at least one cam.

4. The driving control system of the internal clutch as claimed in claim 1, wherein the cam is one of an axial plane cam, a radial cam, an inner cam, an outer cam or a cam like assembly.

* * * * *